United States Patent [19]

Sell

[11] Patent Number: 4,654,803
[45] Date of Patent: Mar. 31, 1987

[54] PHOTOTHERMAL DEFLECTION METHOD OF MEASURING FLUID VELOCITY

[75] Inventor: Jeffrey A. Sell, Huntington Woods, Mich.

[73] Assignee: General Motors Corporation, Detroit, Mich.

[21] Appl. No.: 648,830

[22] Filed: Sep. 10, 1984

[51] Int. Cl.[4] .................. G01F 1/68; G01N 21/41
[52] U.S. Cl. .................................. 364/510; 356/28; 356/128; 356/129; 73/204; 73/861.05; 73/432.1; 364/565
[58] Field of Search .............. 364/510, 509, 525, 565; 73/861.01, 861.05, 204, 432 L, 861.04; 356/27, 128, 129, 130, 436, 28; 374/17

[56] References Cited

U.S. PATENT DOCUMENTS

| | | | |
|---|---|---|---|
| 3,807,228 | 4/1974 | Matzuk | 350/388 |
| 3,950,104 | 4/1976 | Munk | 356/128 |
| 4,480,483 | 11/1984 | McShane | 73/861.05 |

OTHER PUBLICATIONS

W. Herrmann & D. Pohl, "Trace Analysis in Gases by Laser-Induced Schlieren Technique", IBM Technical Disclosure Bulletin, vol. 21, No. 10, 3/79, pp. 4208–4209.

K. Shib et al., "Sehlieren Technique for the Measurement of Low-Level Concentration Fluctuations," Rev. Sci. Instrum., vol. 50, No. 9, 9/79, pp. 1080–1083.

*Primary Examiner*—Errol A. Krass
*Assistant Examiner*—G. Doudnikoff
*Attorney, Agent, or Firm*—Warren D. Hill

[57] ABSTRACT

A method of measuring the velocity of a fluid by nonintrusive means comprises passing a pump laser beam pulse through the fluid wherein the fluid contains a constituent absorbing the wavelength of the laser so that a temperature gradient, and therefore an index of refraction gradient, occurs in the laser beam path; and a probe laser beam is passed transverse to the pump laser beam and is deflected by the heated portion of the fluid; measuring the beam deflection and calculating from that the fluid velocity. After the pump pulse the amount of deflection reaches a peak value and then decreases at a rate independent of the concentration of the absorbing constituent. Where the pump laser beam has a Gaussian spatial profile, the deflection signal decreases according to: $\exp-2(v+/a)^2$, where v is the velocity; t is time; and a is a constant representing the pump laser beam radius. The apparatus is similar to that used for photothermal deflection spectroscopy and involves a pair of crossed laser beams—one for pumping the medium and one for probing the medium; a probe beam deflection sensor; and electronic circuitry for analyzing the measured deflection signal.

2 Claims, 4 Drawing Figures

PHOTOTHERMAL DEFLECTION METHOD OF MEASURING FLUID VELOCITY

This invention relates to an optical method of measuring fluid velocity and especially to a nonintrusive photothermal deflection method of measuring the local velocity in a very small volume of a fluid.

In making studies of physical and chemical phenomena in fluids, such as the combustion of gases or turbulence in liquids or gases, it is desired to measure the fluid velocity at particular points in the fluid independently of dynamic conditions in other portions of the fluid and without intrusion of a mechanical probe. By measuring many local velocities in a fluid, turbulence, stream velocity, and other dynamic fluid conditions can be mapped. Similarly, by measuring the local velocity of gases undergoing combustion or other chemical reaction, the effects of the reaction on velocity (or vice versa) can be investigated.

Photothermal deflection spectroscopy (PDS) is a well known optical measurement technique involving two crossed laser beams for use in stagnant gases or in liquids and/or solids where thermal conduction dominates the heat transfer. This technique is capable of measuring either very small absorption coefficients or low sample concentrations and has been used, for example, to examine the spectra of solid surfaces and absorption in thin films and liquids. My investigation of PDS revealed that it can be used in a flowing stream of gas where forced convection dominates the heat transfer, and I have discovered the quantitative effects of velocity on the PDS measurements.

It is therefore a general object of this invention to provide a method of measuring local velocities in a fluid containing a laser beam absorbing constituent and particularly to such a method which is nonintrusive, independent of fluid velocity in surrounding portions of the fluid, and independent of the concentration of the absorbing constituent. It is a further object of the invention to provide such fluid velocity measurement by photothermal deflection techniques.

The method of the invention is carried out by passing a pulsed pump laser beam through a fluid containing a constituent which absorbs energy from the pump laser beam to heat a portion of the fluid and establish a temperature gradient which results in a gradient in the index of refraction; passing a probe laser beam transversely through the heated portion of the fluid such that the probe beam is deflected by reason of the gradient in the index of refraction; measuring the rate of decrease of the probe beam deflection following the peak deflection; and calculating the local velocity of the heated portion from the measured rate of decrease of deflection.

The above and other advantages of the invention will become apparent from the following description and accompanying drawings, wherein.

Figure 1:
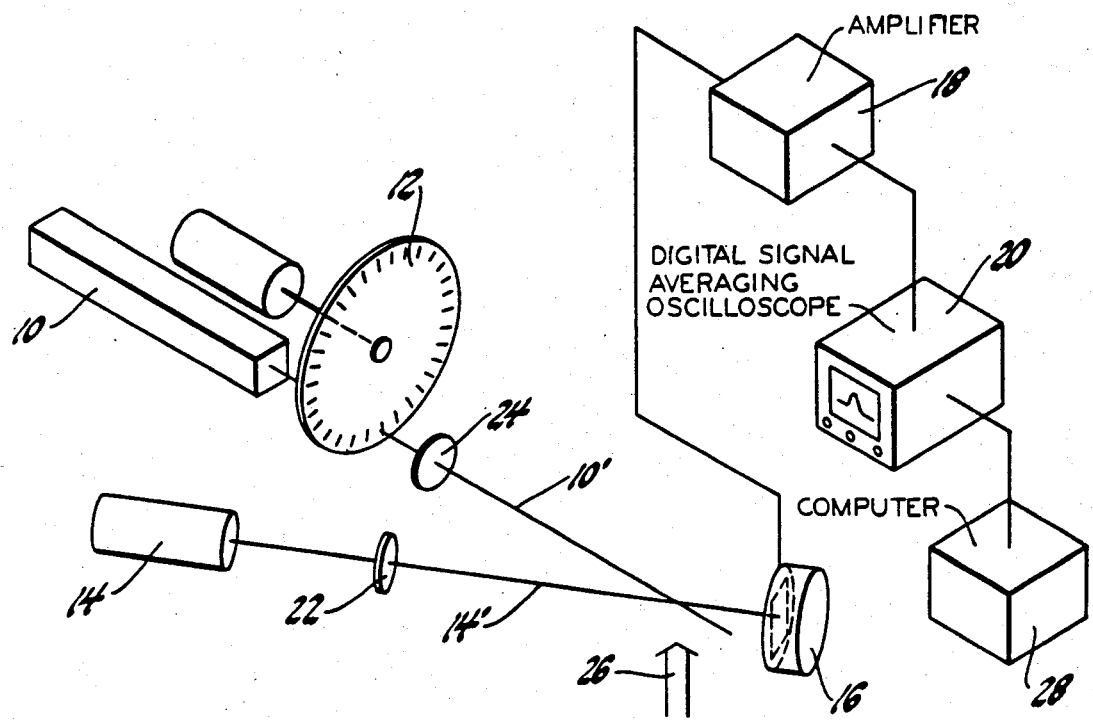
FIG. 1 is a schematic view of photothermal deflection apparatus for carrying out the method of the invention.

A diagram of the apparatus is shown in FIG. 1. The pump laser 10 shown is a Model 570 $CO_2$ laser manufactured by Apollo Lasers of Los Angeles, Calif., which is capable of producing more than 50 watts CW power on each of approximately 25 different $CO_2$ lasing transitions. The P(14) line of the $CO_2$ 10.6 micron band is selected by a grating in the laser. In the practice of this invention, the laser 10 is preferably operated in the CW operational mode. A mechanical chopper 12 is employed which has a duty cycle of 3.3% and is operated at a speed which gives pulses at 100 Hz and produces a nearly temporally rectangular pulse.

A probe laser 14 employed is a Model 145-01 He-Ne laser manufactured by Spectra-Physics, Inc., of San Jose, Calif. The power, which is relatively unimportant for this purpose, is about 1 mW.

A lateral cell detector 16 (Model 386-22-21-251 manufactured by Silicon Detector Corporation of Newbury Park, Calif.) is employed for measuring the deflection of the probe laser beam. It is capable of measuring shifts in the position of the laser beam of the order of $\pm 10^{-4}$ cm. Operational amplifiers in amplifier 18 are employed to amplify the signal; the bandwidth of this circuit is greater than 1 MHz.

For data collection, a Model 468 digital signal averaging oscilloscope 20 manufactured by Tektronix, Inc., of Beaverton, Oreg. is used to store the data as well as to display the deflection curve. The signal averaging feature of this oscilloscope is especially useful for improving the signal/noise ratio. All results discussed herein were obtained by averaging 256 laser pulses. Other data acquisition devices could be employed, e.g., a computer with an A/D converter, a transient digitizer, or a boxcar averager. A computer 28 coupled to the oscilloscope 20 analyzes the collected data to calculate velocity.

The optics in this apparatus are quite simple. A $BaF_2$ lens 22 of 15.2 cm focal length is used to focus the He-Ne probe laser beam 14' to a Gaussian spot of 1/e intensity radius of 79 microns. The $CO_2$ pump laser beam 10' is focused with a ZnSe lens 24 of 16.5 cm focal length to an average radius of about 150 microns. The intensity profile of pump beam 10' is not Gaussian since there is a central dip in the profile; however, the upstream side of the beam does exhibit a Gaussian rate of decrease of intensity. For the method of this invention, that is considered to be equivalent to a Gaussian profile. The pump beam 10' is moved relative to the probe beam 14' by moving the lens 24 that focuses the $CO_2$ beam. This equipment is easy to align optically since there are no phase-matching conditions and the angle between the two lasers is somewhat arbitrary.

Figure 2:
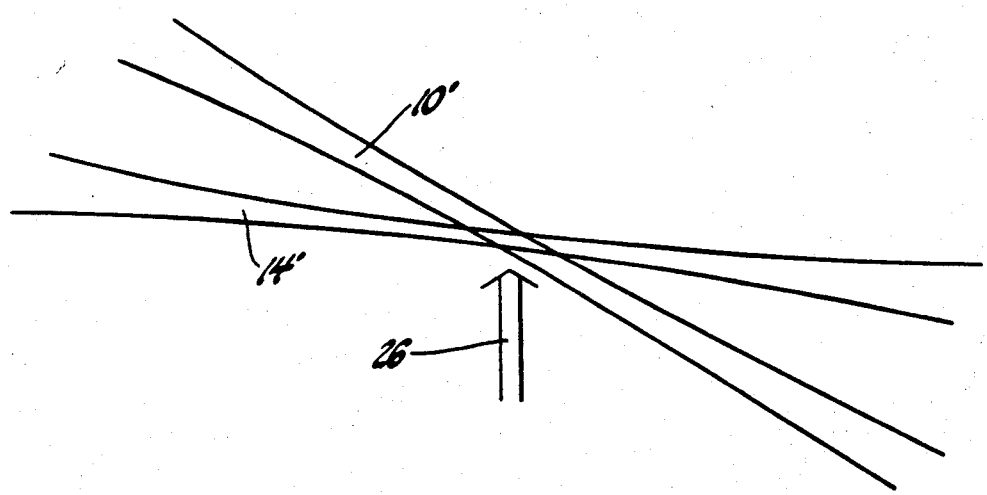
FIG. 2 is an enlarged view of the laser beam interaction region of the apparatus of FIG. 1.

As shown in FIGS. 1 and 2, arrow 26 indicates the direction of flow of gas or other fluid to be measured. It is preferred that the beams overlap such that they are coplanar. It is also preferred that the probe beam 14' waist at the interaction region be significantly smaller than the pump beam 10' waist. The two beams cross at an angle of 20° which determines the interaction length (about 0.1 cm) of the lasers. The interaction volume occupied by the crossed laser beams is about $6.4 \times 10^{-5}$ $cm^3$; this volume defines the spatial resolution.

In order for the fluid to be heated by the pump beam 10', the fluid must contain a constituent which absorbs the wavelength of the pump beam. Accordingly, for investigation of a particular fluid, it is necessary to select a pump laser which provides a suitable wavelength. Alternatively, the fluid may be seeded with a constituent which absorbs the pump beam wavelength. For example: to obtain the data in FIG. 3, a small amount of ethylene (1019 ppm) was added to nitrogen to obtain a measurement of the nitrogen flow. The ethylene absorbs the particular pump beam wavelength described above, and the peak detector signal is proportional to the concentration of the ethylene. Many absorbing species may be used with the specified pump laser 10 and, of course, other species are appropriate for use with other lasers. The product of the laser peak power, the absorption coefficient of the gas, and the concentration of the absorbing gas should be approximately $1.5 \times 10^{-2}$ cm$^{-1}$ watt to get an easily measurable signal. The temperature of the fluid must also be constant, within 10° to 20° Celsius, for the present method to be accurate. The pump laser heats the fluid only a few degrees (for absorber concentration below 10,000 ppm and pump laser average power below about 1 watt) so that this condition is not violated by the pump laser.

Figure 3:
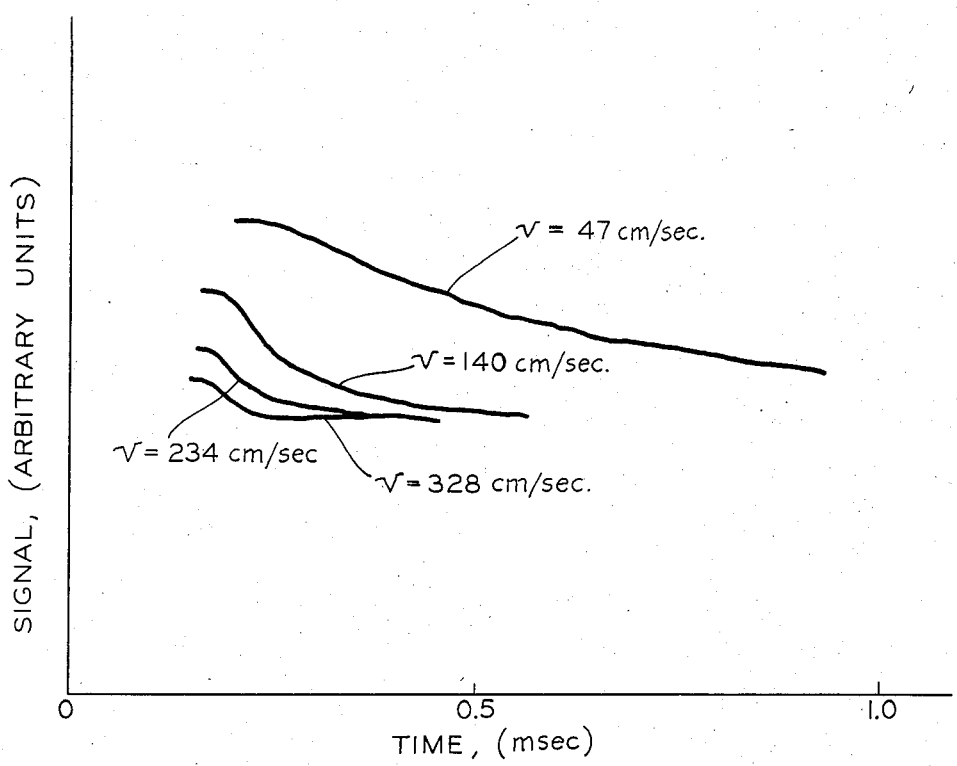
FIG. 3 is a graph of a function of measured deflection signal and time for different velocities in the region being studied.

FIG. 3 shows the decreasing deflection signal, S, after the peak value for four different gas velocities, i.e., 47, 140, 234, and 328 cm/sec. It should be noted that the rate of decrease is greater for higher gas velocities. At low gas velocities, thermal conduction influences the deflection signal so that this velocity measuring method is limited to higher velocities. For the present study in nitrogen, the lower limit is about 100 cm/sec, while the upper limit is about 500 cm/sec, or even higher. The lower limit is determined by the point at which thermal conduction can no longer be ignored in the heat transfer. This depends on the density, heat capacity, and thermal conductivity of the fluid, as well as the size of the pump beam 10'. The upper limit is determined by the ability of the instrument to measure rapid decay of the probe laser beam 14' displacement. The magnitude of the peak displacement is inversely proportional to the velocity, thus at higher velocities the measurement of the rate of decay becomes more difficult. This depends also on the sensitivity of the detector, the noise (due primarily to turbulence), the gas absorption coefficient, and the pump laser power.

Figure 4:
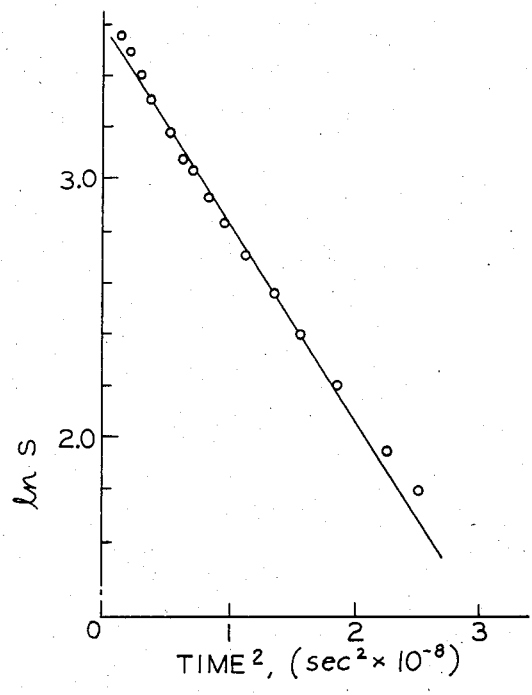
FIG. 4 is a graph of the logarithm of deflection plotted against time squared during the period of deflection decrease for one flow rate.

In view of the lower velocity limit, the 47 cm/sec curve of FIG. 3 is useful only to illustrate qualitatively the trend of the signal shape. The remaining three curves (140, 234, 328 cm/sec) exhibit an exponential signal decrease in the form of $\exp -2(v+/a)^2$, where v is velocity, t is time and a is a constant representing the pump laser beam 10' radius. Thus if the deflection data as a function of time are acquired, the velocity can be calculated. As shown in FIG. 4—which plots the logarithm of the deflection signal, ln S, for the decreasing deflection signal against time squared, $t^2$, for one flow rate—there is a linear relationship between these values. The slope of the line is $-2(v/a)^2$. The expression for velocity is then $v=a(-\text{slope}/2)^{\frac{1}{2}}$.

The temperature profile of the trailing edge of the heated portion of the fluid is dependent on the spatial intensity profile of the laser beam and on the fluid velocity. For the rate of signal decrease to be proportional to $\exp -2(v+/a)^2$, the trailing or upstream edge of the pump laser beam must have a Gaussian profile, $\exp-(x/a)^2$, where x is the radial distance from the beam axis. This is true if the pump laser oscillates in the fundamental TEM$_{00}$ mode—and may be true for other modes as well. If the pump laser beam spatial profile were other than Gaussian, a different relationship would exist between the spatial profile of the pump laser beam 10' and the rate of decrease of the deflection of the probe laser beam 14'. This method requires that the spatial profile of the pump laser beam be known. The profile can be easily measured by a self-scanned pyroelectric array detector made by Spiricon, Inc., of Logan, Utah. Another method would be to mount a narrow slit in front of a detector and then translate the detector/slit assembly across the laser beam.

In summary, the method of the invention comprises passing a pulsed pump beam 10' from the CO$_2$ laser 10 through the fluid being measured to heat the fluid in the path of the beam 10', and to sense the temperature gradient of the heated fluid by a probe beam 14' from the helium-neon (He-Ne) laser 14, which beam crosses the path of the pump beam 10' to intercept the heated portion of the fluid. The temperature gradient of the fluid controls the index of refraction gradient of the fluid so that the heated portion serves as a lens and deflects the probe beam 14' in the upstream direction. The rate of decrease of deflection following a peak deflection is a function of the pump beam spatial intensity profile and fluid velocity. The rate of deflection is measured and the velocity is calculated.

The above analysis assumes that the gas velocity is in a direction perpendicular to the plane of the crossed laser beams, i.e., the x direction. However, if there is a component of gas velocity parallel to the plane of the laser beams and perpendicular to the probe beam (i.e., the y direction), then the probe beam would have a component of deflection in the plane of the laser beams. The detector 16 has the ability to measure separately the x and y deflections of the probe beam so that it is possible to analyze the two sets of detector outputs to determine the vector resultant of the fluid velocity.

The apparatus of FIG. 1 makes it possible to mechanically chop the pump beam 10' by the chopper 12 to produce a rapid series of short pump pulses so that many measurements at a given sample volume in the fluid stream may be made in a very short time period. The averaging oscilloscope 20 allows averaging of those measurements to effectively filter noise from the data and increase the resolution of the measured value. For many uses, however, the signal-to-noise ratio has been found to be high enough that a single measurement at each data point is sufficient and the averaging technique is not required. In this case, the time resolution of the velocity measurement would be very good.

This photothermal deflection method of measuring fluid velocity has high spatial resolution, it is a nonintrusive optical method applicable over a wide range of velocities, it is independent of the concentration of the absorbing gas, and optical alignment is easily accomplished. Many types of lasers work well as pump lasers provided the wavelength matches the absorption band of the absorbing gas.

The embodiments of the invention for which an exclusive property or privilege is claimed are defined as follows:

1. The method of measuring the local velocity in a fluid by photothermal deflection comprising the steps of:
  heating a portion of the fluid by passing a pulsed focused laser pump beam through the fluid, the pump beam having a known spatial profile and a wavelength which is absorbed by a constituent of the fluid to establish a temperature gradient, whereby the temperature gradient causes a gradient in the index of refraction;

detecting the temperature gradient in a local volume of the fluid by passing a laser probe beam transversely through the heated portion of the fluid to cause deflection of the probe beam, whereby the deflection is a function of the local velocity of the heated portion of the fluid;

sensing the deflection of the probe beam following a laser pump pulse and measuring the rate of decrease of deflection following the peak deflection; and calculating the local velocity from the rate of decrease of deflection and the spatial profile of the pump laser beam.

2. The method of measuring the local velocity in a fluid by photothermal deflection comprising the steps of:

heating a portion of the fluid by passing a pulsed focused laser pump beam through the fluid, the pump beam having a Gaussian spatial profile at its upstream edge and a wavelength which is absorbed by a constituent of the fluid to establish a temperature gradient, whereby the temperature gradient causes a gradient in the index of refraction;

detecting the temperature gradient in a local volume of the fluid by passing a laser probe beam transversely through the heated portion of the fluid to cause deflection of the probe beam, whereby the deflection is a function of the local velocity of the heated portion of the fluid;

sensing the deflection of the probe beam following a laser pump pulse and measuring the rate of decrease of deflection following the peak deflection, the rate of decrease of deflection following the relationship: $\exp-2(v+/a)^2$; where v is the velocity, t is time, and a is a constant; and calculating the local velocity from the rate of decrease of deflection and the said relationship.

* * * * *